(12) United States Patent
Tompkins et al.

(10) Patent No.: US 8,646,183 B2
(45) Date of Patent: Feb. 11, 2014

(54) PROCESS FOR FORMING A FIBER REINFORCED CORE PANEL ABLE TO BE CONTOURED

(75) Inventors: Michael Tompkins, Cherryville, NC (US); Anthony S. Brandon, Moore, SC (US)

(73) Assignee: Milliken & Company, Spartanburg, SC (US)

( * ) Notice: Subject to any disclaimer, the term of this patent is extended or adjusted under 35 U.S.C. 154(b) by 306 days.

(21) Appl. No.: 13/065,087

(22) Filed: Mar. 14, 2011

(65) Prior Publication Data
US 2012/0233861 A1 Sep. 20, 2012

(51) Int. Cl.
*B21D 53/88* (2006.01)

(52) U.S. Cl.
USPC ............ 29/897.2; 29/897.32; 244/123.1; 428/178; 428/188

(58) Field of Classification Search
USPC ........... 29/897.32, 897, 897.2, 312, 463, 469; 244/120, 123.1, 123.12, 123.13, 123.4, 244/123.6; 428/56, 178, 188, 292.1
See application file for complete search history.

(56) References Cited

U.S. PATENT DOCUMENTS

| | | | |
|---|---|---|---|
| 3,528,875 A | 9/1970 | MacDonald et al. | 428/132 |
| 3,544,417 A | 12/1970 | Corzine | 161/50 |
| 3,996,084 A | 12/1976 | Holmes | 156/93 |
| 4,068,434 A | 1/1978 | Day et al. | 52/220 |
| 4,083,159 A | 4/1978 | Hatch et al. | 52/309.1 |
| 4,115,610 A | 9/1978 | Wortman | 428/102 |
| 4,147,004 A | 4/1979 | Day et al. | 52/309.9 |
| 4,463,043 A | 7/1984 | Reeves et al. | 428/68 |
| 4,764,420 A | 8/1988 | Gluck et al. | 428/317.7 |
| 4,774,794 A | 10/1988 | Grieb | 52/309.7 |
| 4,819,608 A | 4/1989 | Filice et al. | 124/23 |
| 5,069,737 A | 12/1991 | Guiton | 156/210 |
| 5,098,778 A | 3/1992 | Minnick et al. | 428/285 |
| 5,192,598 A | 3/1993 | Forte et al. | 428/71 |

(Continued)

FOREIGN PATENT DOCUMENTS

| DE | 197 15 529 | 8/1998 |
|---|---|---|
| DE | 19751516 | 5/1999 |

(Continued)

OTHER PUBLICATIONS

Patent Cooperation Treaty—International Search Report. Date of Mailing, May 31, 2012. International Application No. PCT/US2012/022166, International Filing Date Jan. 23, 2012.

*Primary Examiner* — David Bryant
*Assistant Examiner* — Ryan J Walters
(74) *Attorney, Agent, or Firm* — Cheryl J. Brickey

(57) ABSTRACT

A process for forming a fiber reinforced core panel which is able to be contoured includes the following steps. First, slice a sheet of a low density material a plurality of times in a first direction of the sheet on at least one side, where the slices extend through only a portion of the thickness of the sheet, then divide the sheet in the second direction of the sheet into a series of low density strips having at least three faces (major face, a first edge face, a second edge face, and optionally a minor face) where the slices in the sheet form a series of cuts in the major or minor face of the low density strips. Next, arrange the series of low density strips to form a core panel and thread a continuous fibrous reinforcement sheet through the low density strips such that the fibrous reinforcement sheet is disposed between adjacent strips and adjacent to the major or minor faces of the low density strips.

23 Claims, 12 Drawing Sheets

(56) References Cited

U.S. PATENT DOCUMENTS

| | | | |
|---|---|---|---|
| 5,431,996 A | 7/1995 | Giesemann | 428/288 |
| 5,462,623 A | 10/1995 | Day | 156/250 |
| 5,520,976 A | 5/1996 | Giannetti et al. | 428/36.3 |
| 5,589,016 A | 12/1996 | Hoopingarner et al. | 156/87 |
| 5,589,243 A | 12/1996 | Day | 428/56 |
| 5,679,432 A | 10/1997 | Holmquest et al. | 428/71 |
| 5,698,057 A | 12/1997 | Abouzahr et al. | 156/242 |
| 5,773,121 A | 6/1998 | Meteer et al. | 428/117 |
| 5,834,082 A | 11/1998 | Day | 428/56 |
| 5,857,414 A | 1/1999 | Thoman et al. | 105/397 |
| 5,958,325 A | 9/1999 | Seemann, III et al. | 264/510 |
| 6,151,743 A | 11/2000 | Church et al. | 14/73 |
| 6,205,728 B1 | 3/2001 | Sutelan | 52/309.7 |
| 6,217,700 B1 | 4/2001 | Knobel | 156/296 |
| 6,497,190 B1 | 12/2002 | Lewit | 114/357 |
| 6,645,333 B2 | 11/2003 | Johnson et al. | 156/92 |
| 6,676,785 B2 | 1/2004 | Johnson et al. | 156/92 |
| 6,701,683 B2 | 3/2004 | Messenger et al. | 52/309.11 |
| 6,740,381 B2 | 5/2004 | Day et al. | 428/56 |
| 6,824,851 B1 | 11/2004 | Locher et al. | 428/76 |
| 6,972,144 B2 | 12/2005 | Roth et al. | 428/68 |
| 7,056,567 B2 | 6/2006 | O'Neill et al. | 428/71 |
| 7,063,887 B2 | 6/2006 | Kobe et al. | 428/317.9 |
| 7,264,878 B2 | 9/2007 | Miller et al. | 428/408 |
| 7,393,577 B2 | 7/2008 | Day et al. | 428/121 |
| 7,851,048 B2 | 12/2010 | Brandon et al. | 428/178 |
| 2003/0213544 A1 | 11/2003 | Hesch | 156/79 |
| 2004/0053035 A1 | 3/2004 | Haas | 428/311.51 |
| 2004/0247856 A1 | 12/2004 | Sikorski et al. | 428/318.4 |
| 2005/0019549 A1 | 1/2005 | Tai et al. | 428/315.9 |
| 2005/0074593 A1 | 4/2005 | Day et al. | 428/292.1 |
| 2005/0146076 A1 | 7/2005 | Alexander et al. | 264/257 |
| 2006/0148917 A1 | 7/2006 | Radwanski et al. | 521/99 |

FOREIGN PATENT DOCUMENTS

| | | |
|---|---|---|
| EP | 0844929 | 4/2002 |
| WO | WO 97/03828 | 2/1997 |
| WO | WO 01/47706 | 7/2001 |
| WO | WO 2005/018926 | 3/2005 |

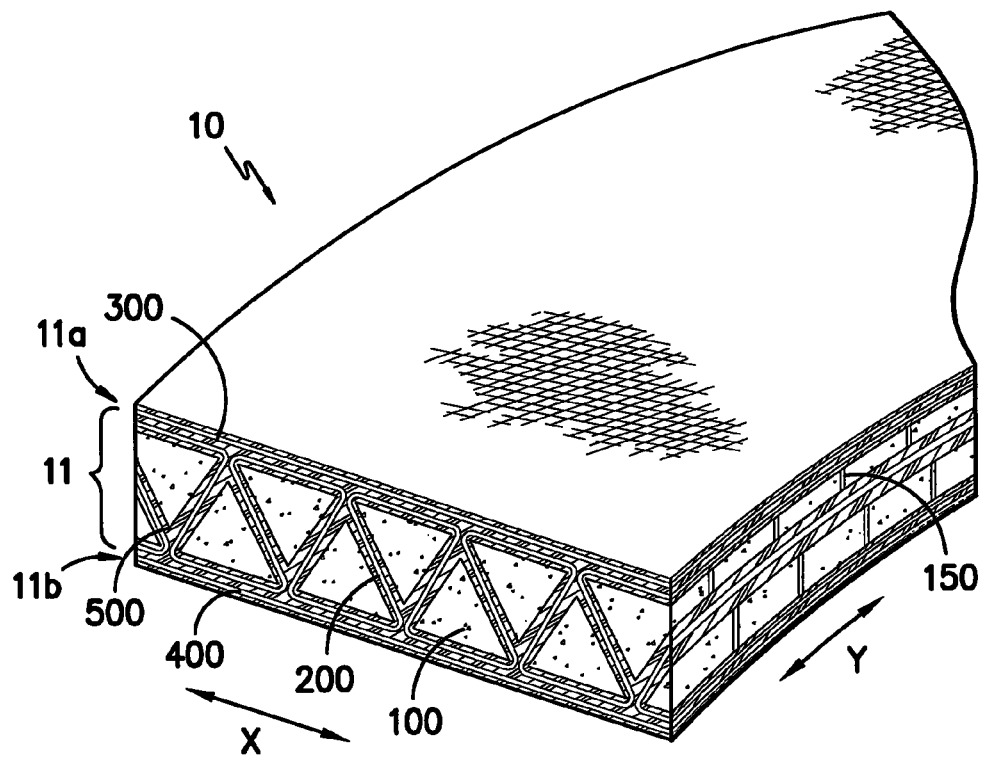
FIG. -1-
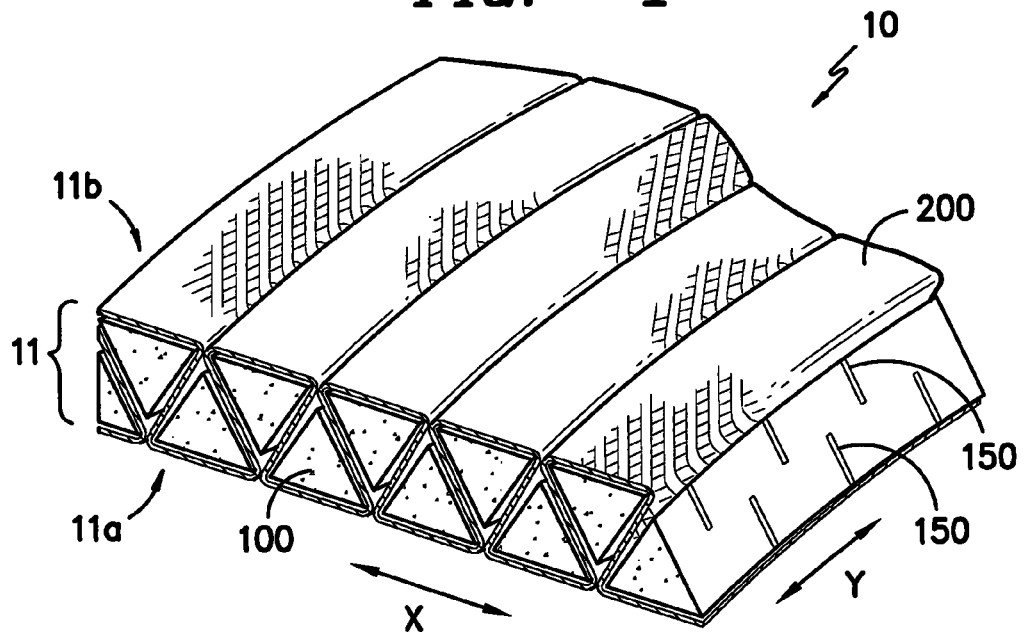
FIG. -2-

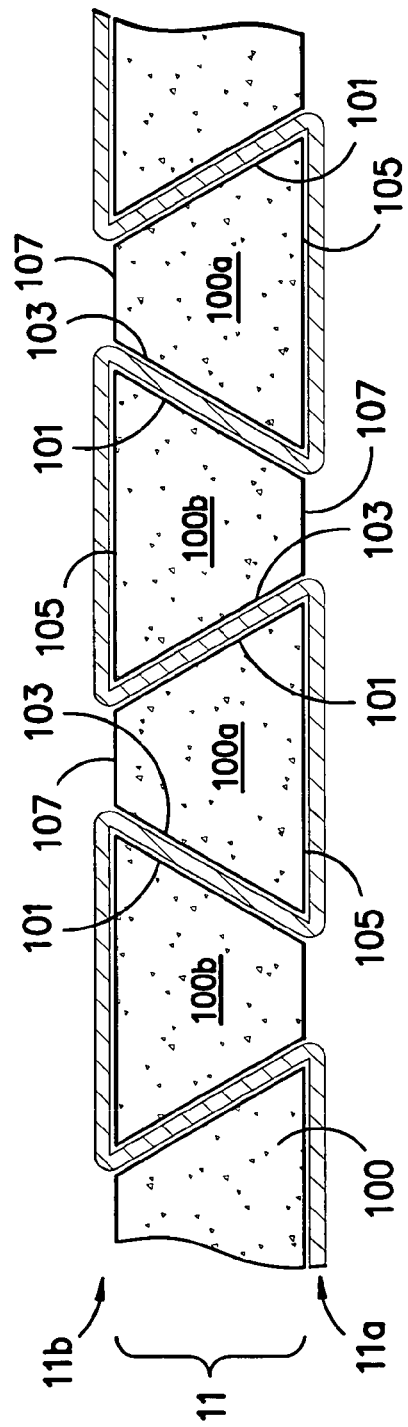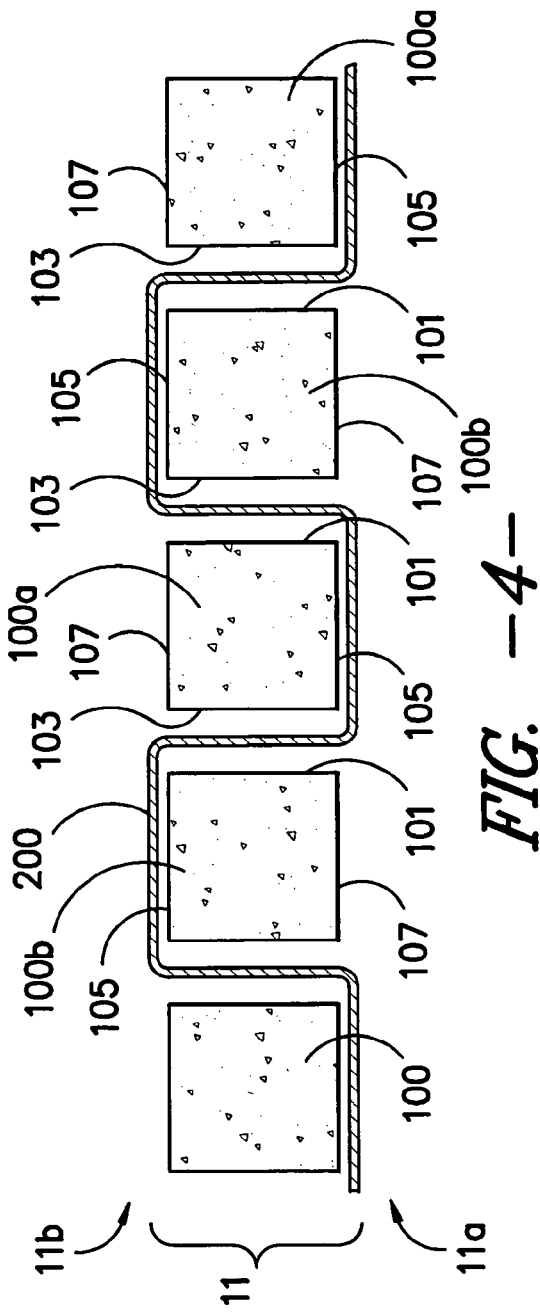

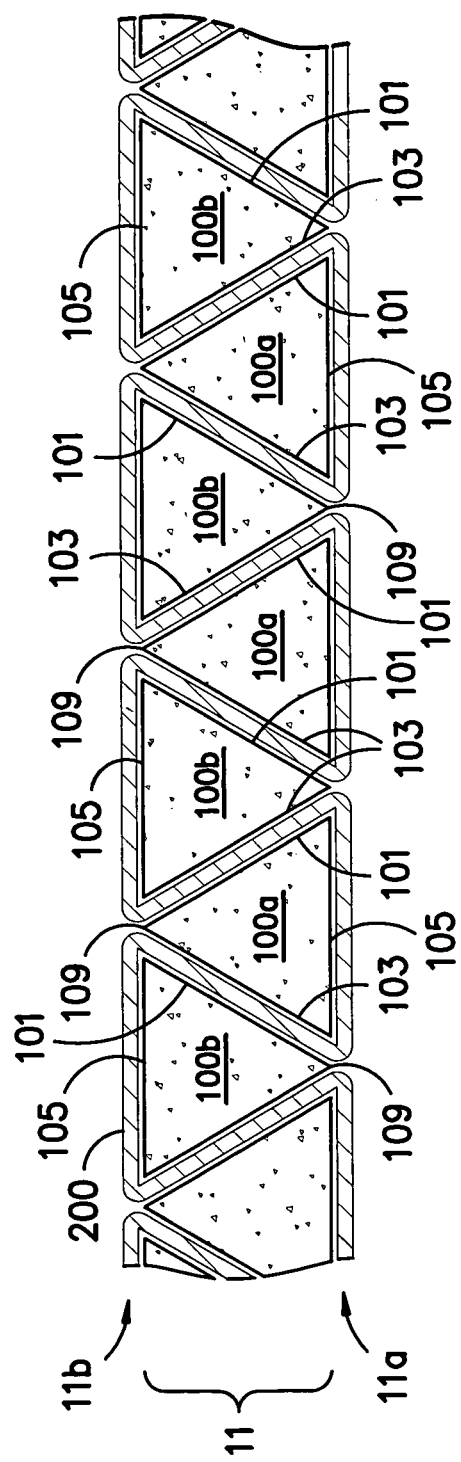
FIG. -5-

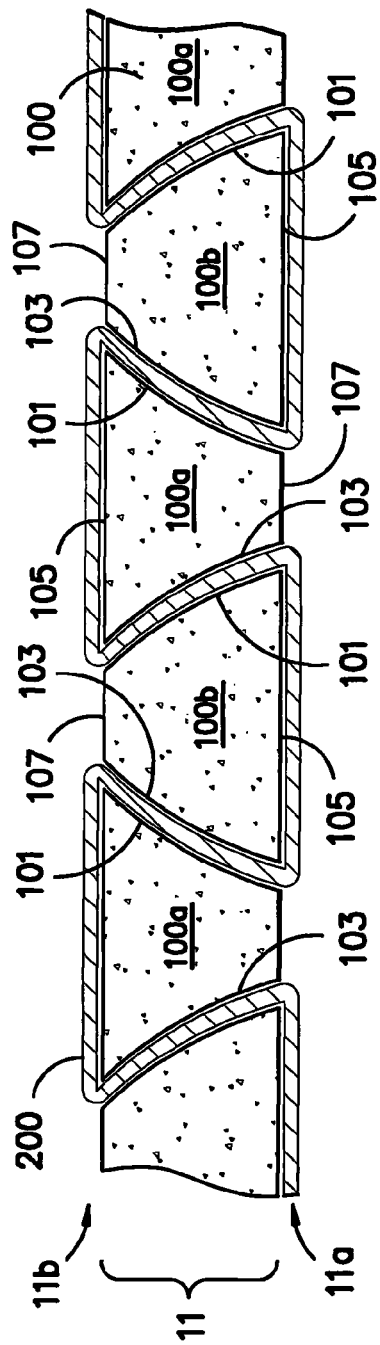
FIG. -6-
FIG. -7B-
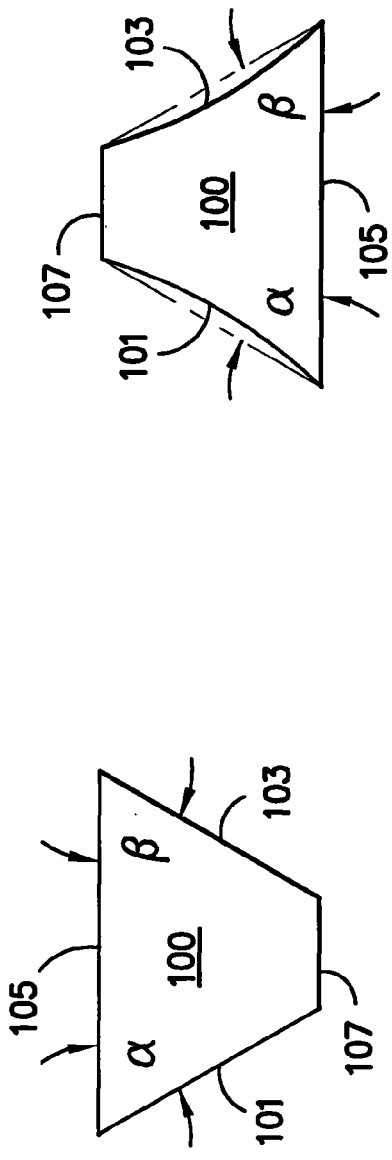
FIG. -7A-

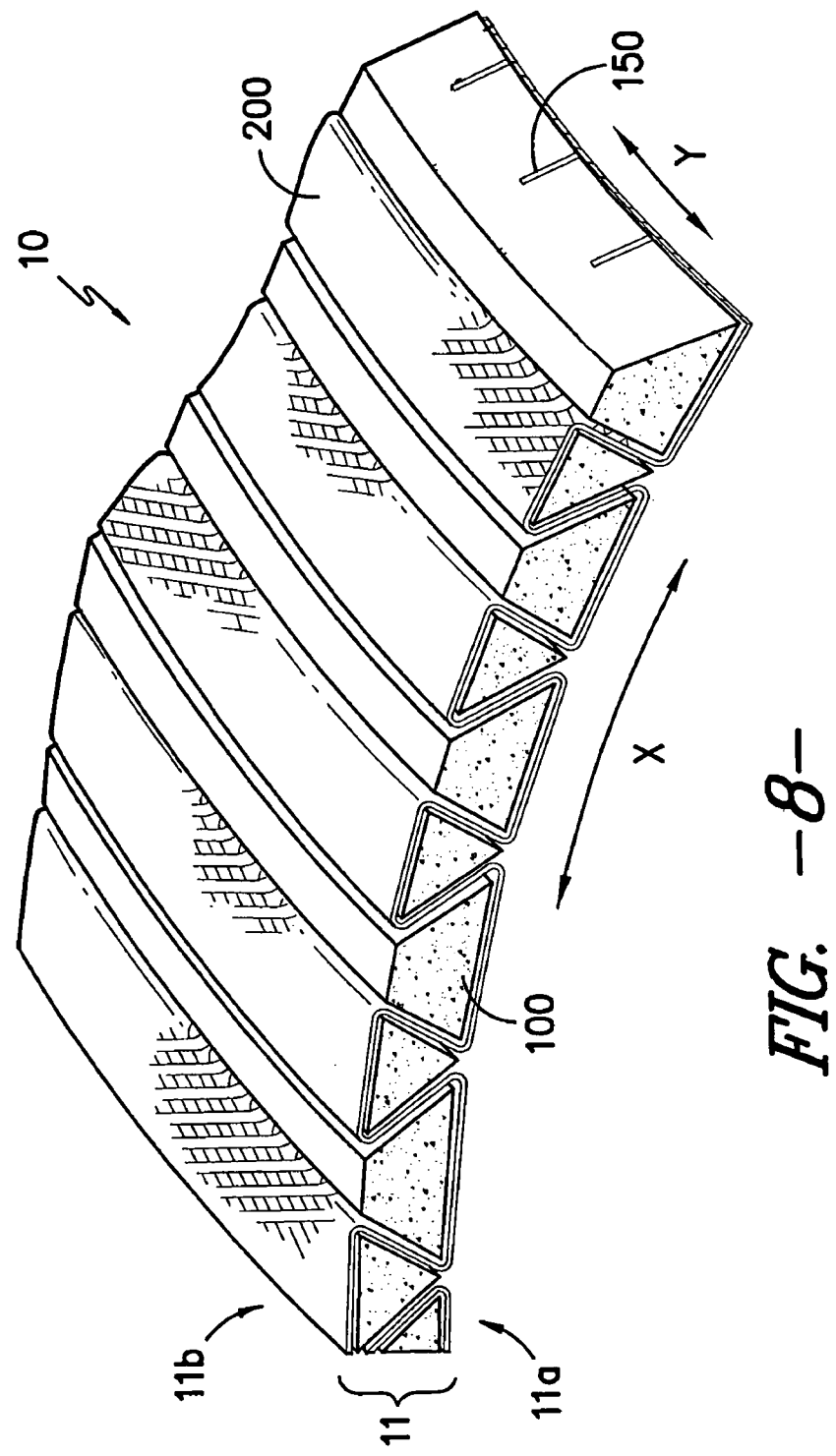
FIG. -8-

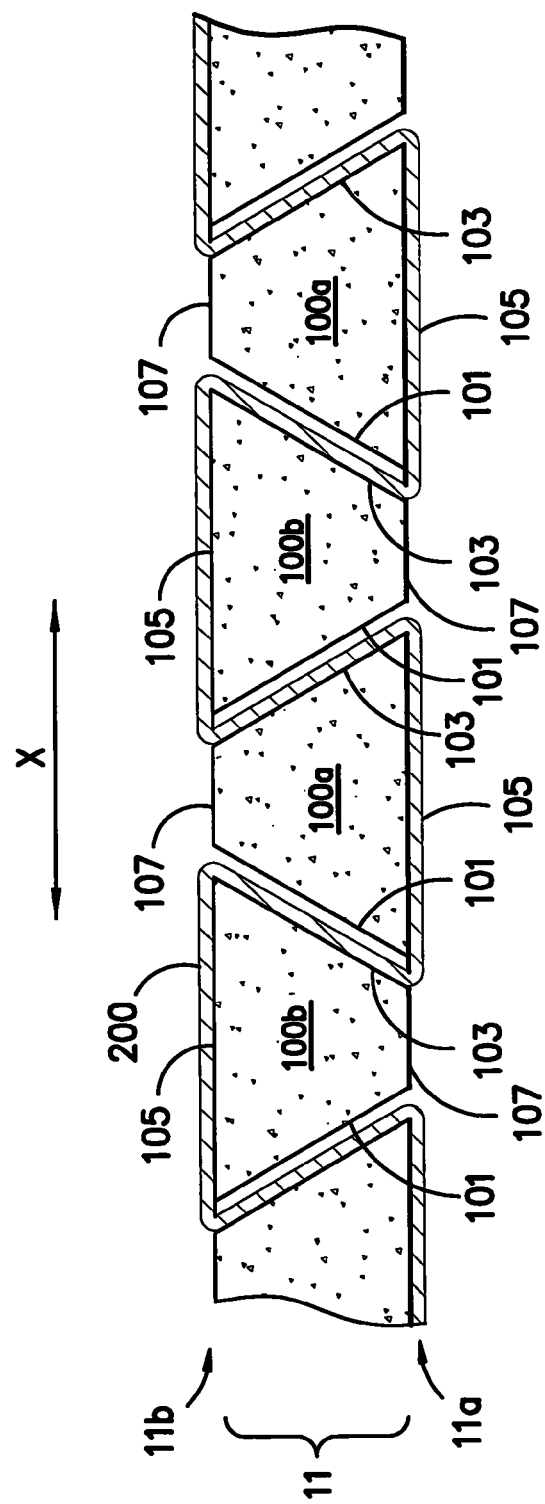
FIG. -9-

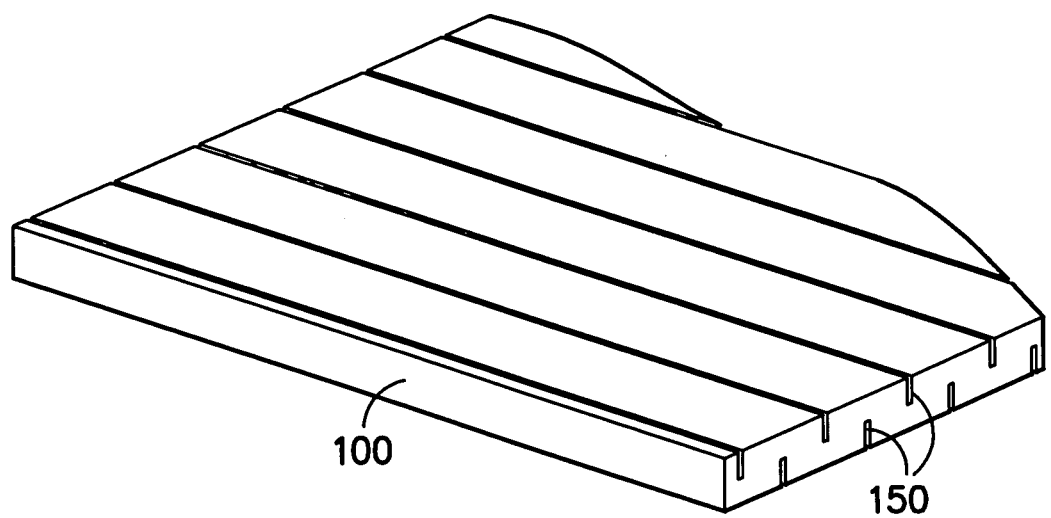
FIG. -10-
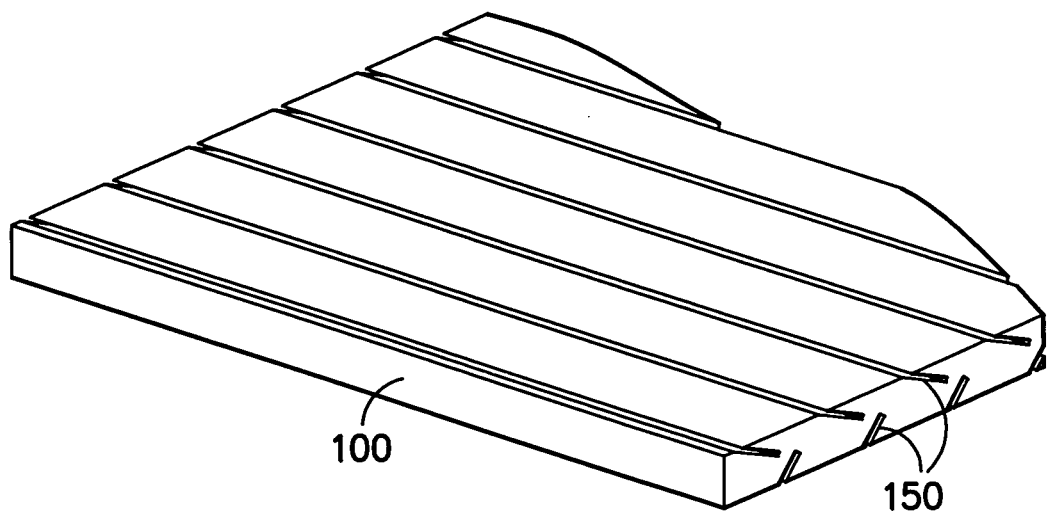
FIG. -11-

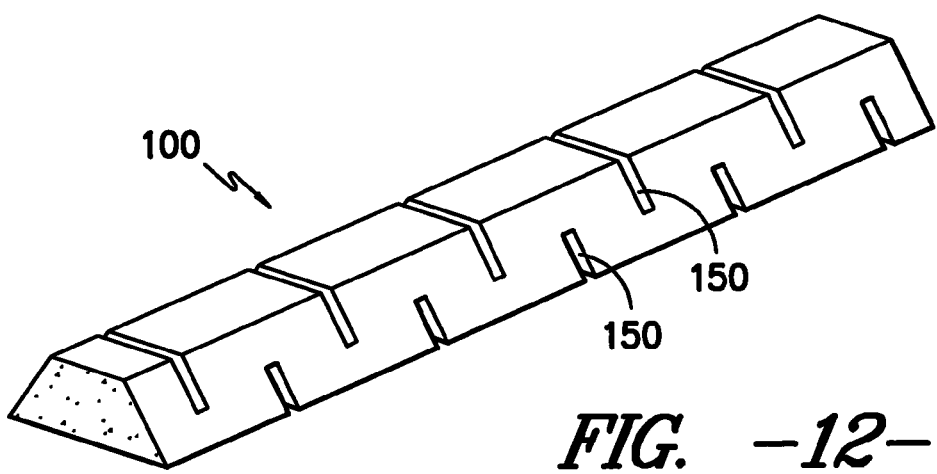
FIG. -12-
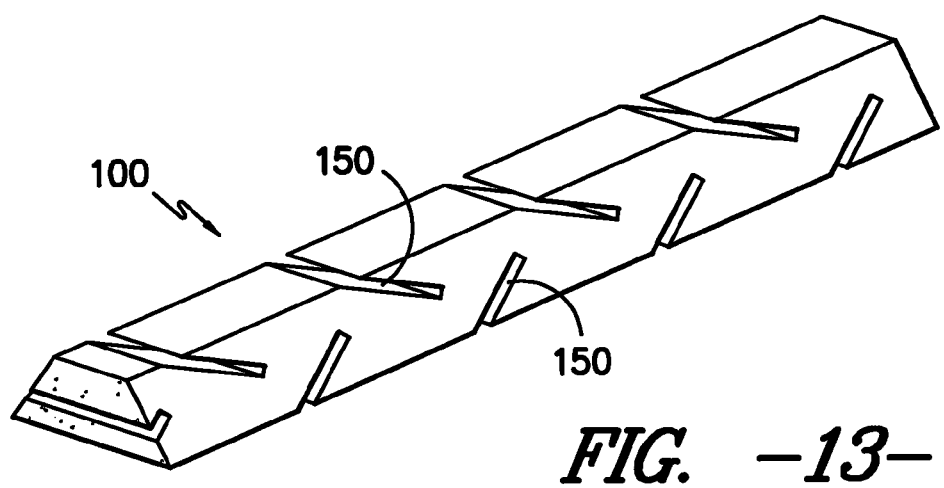
FIG. -13-
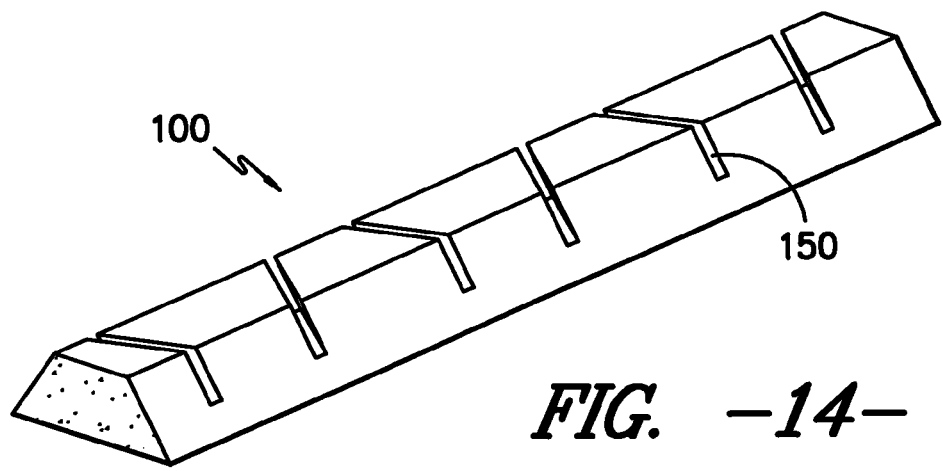
FIG. -14-

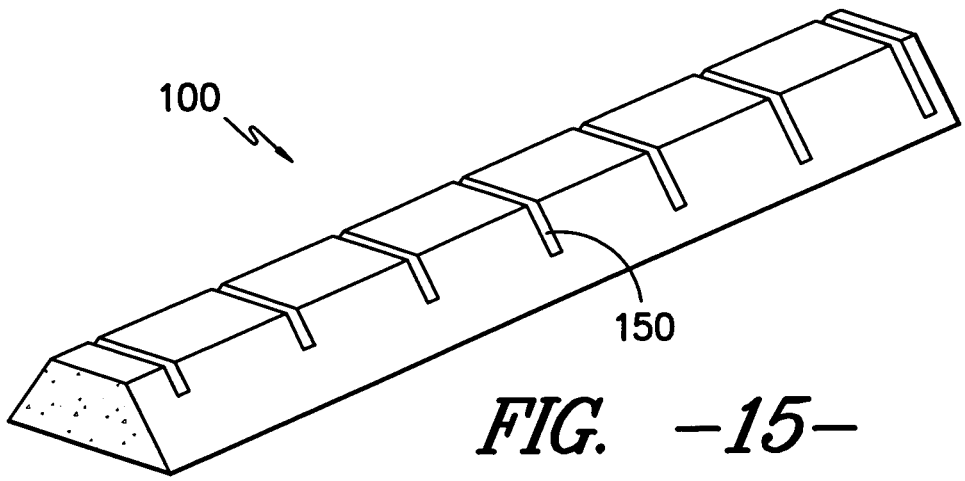
FIG. -15-
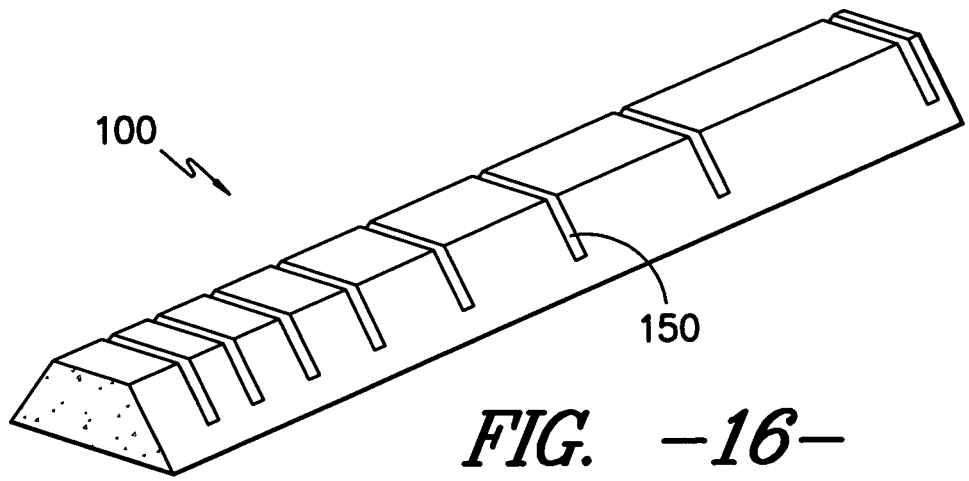
FIG. -16-
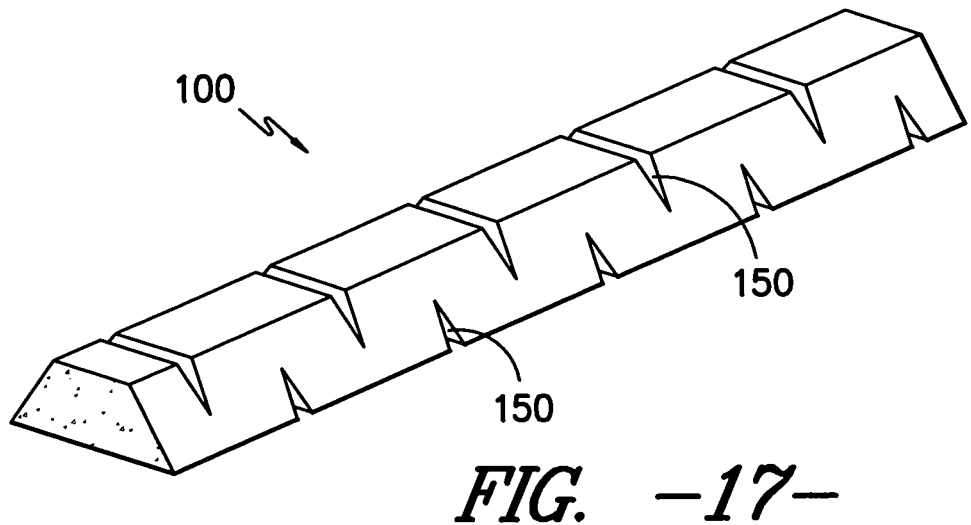
FIG. -17-

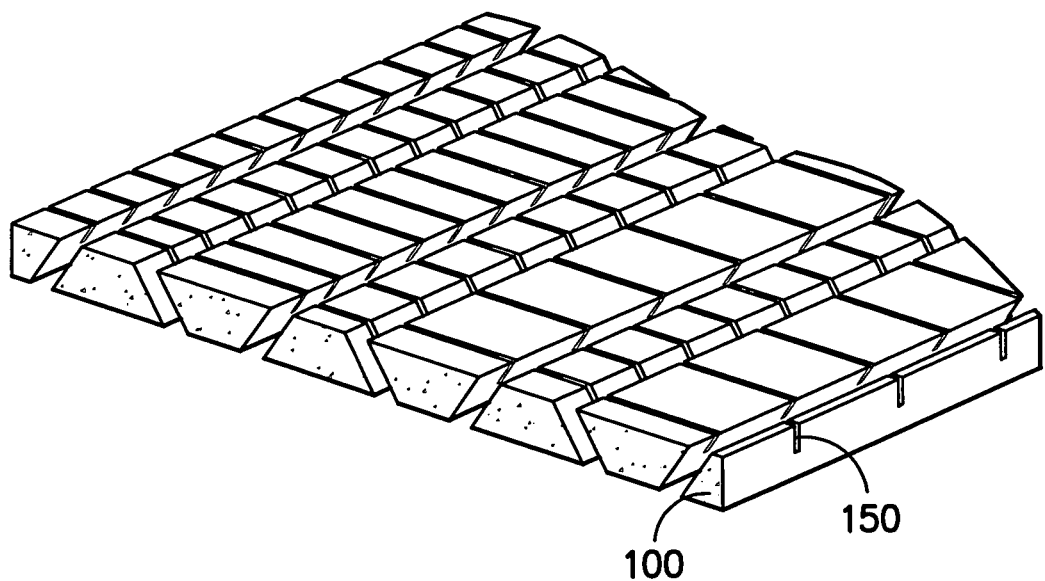
FIG. -18-
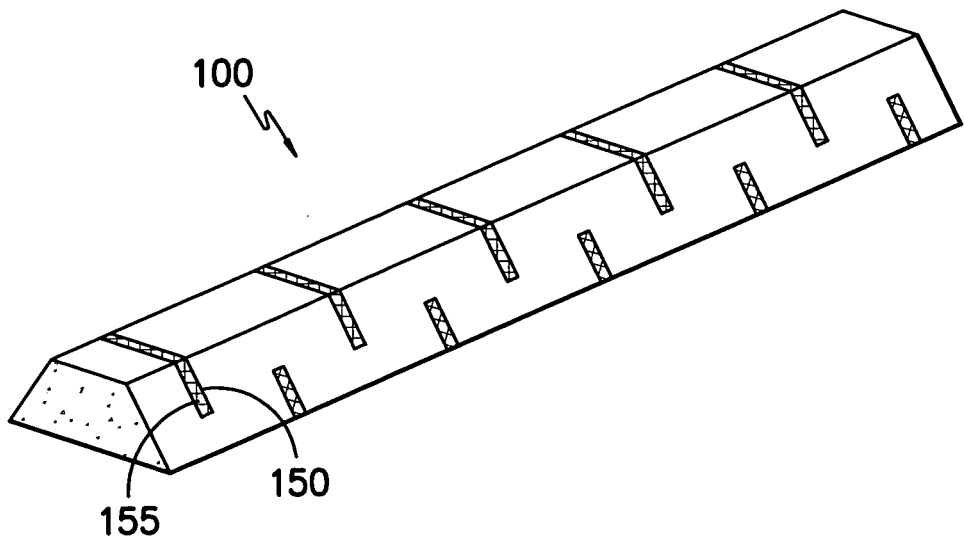
FIG. -19-

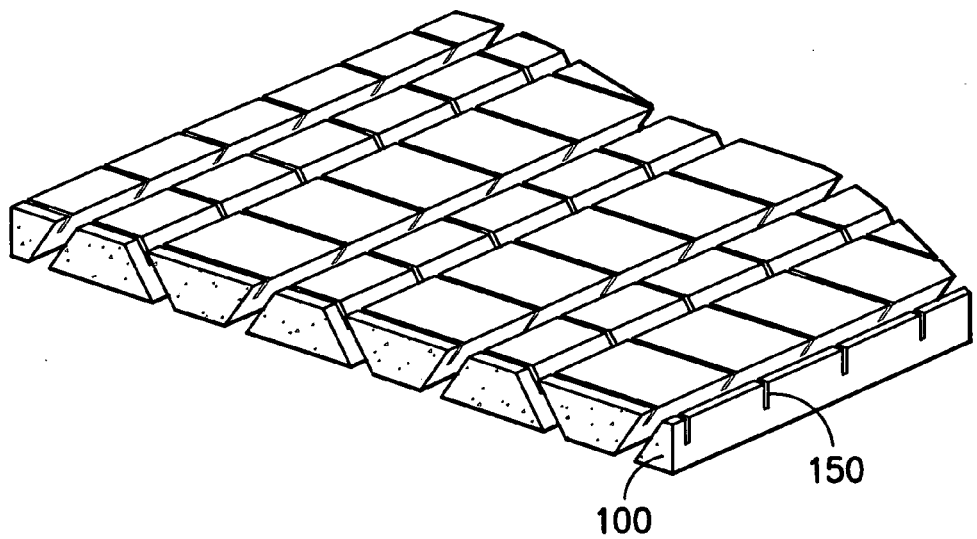
FIG. -20-
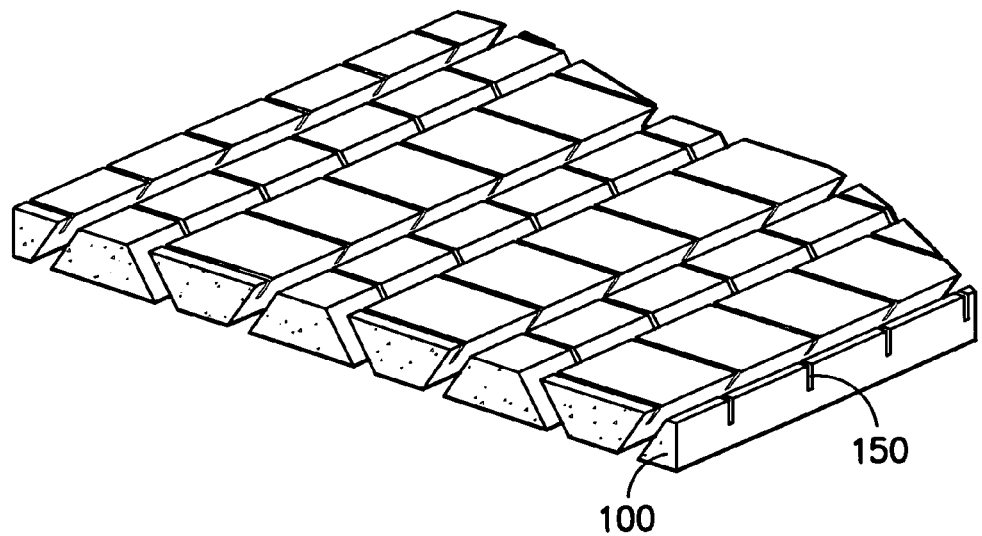
FIG. -21-

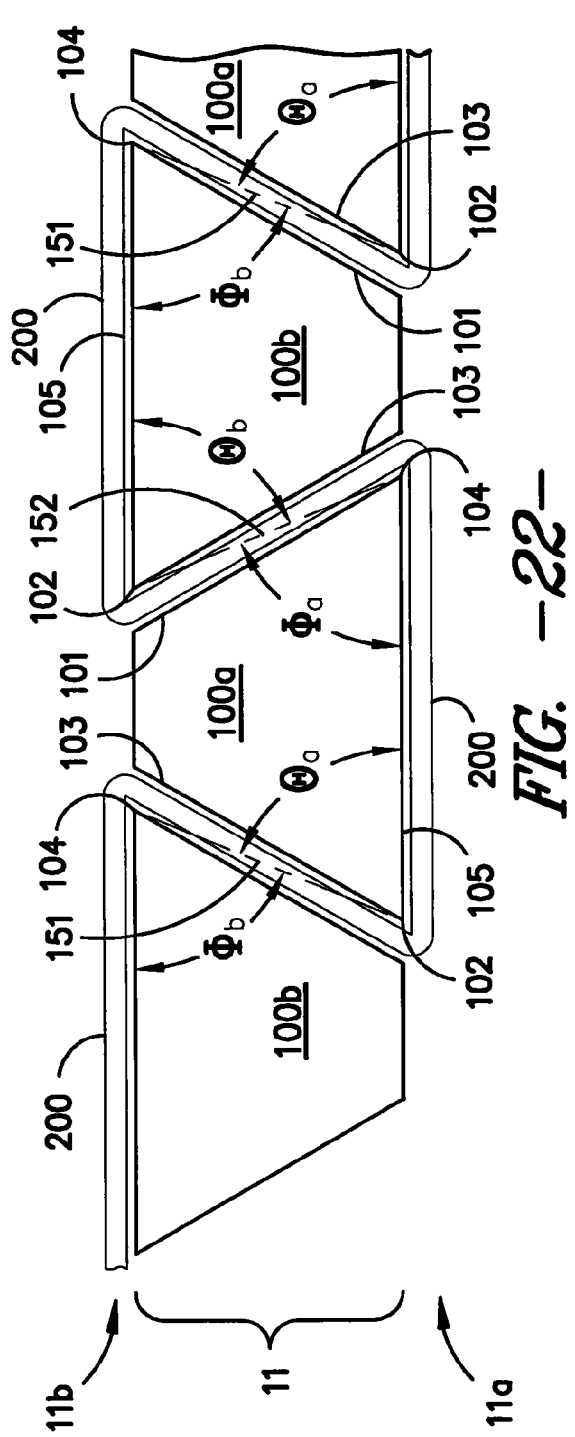
FIG. -22-
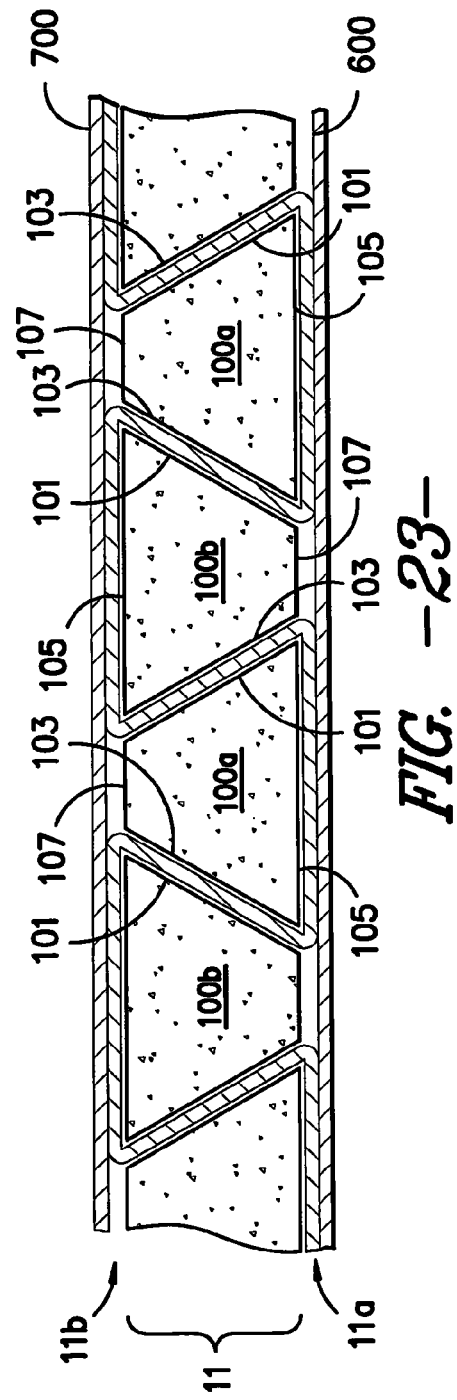
FIG. -23-

US 8,646,183 B2

PROCESS FOR FORMING A FIBER REINFORCED CORE PANEL ABLE TO BE CONTOURED

TECHNICAL FIELD

This invention relates generally to processes for forming composite structures. More particularly, the invention relates to processes for forming a fiber reinforced core panel having a series of strips containing a series of cuts wrapped with a fibrous reinforcement sheet and the composite structures made there from.

BACKGROUND

It is common practice in the industry to score foam panels and balsa wood in order to allow it to curve around complex shapes. Scoring consists of cutting slits partially through the panel on each side, or cutting slits completely through the panel and securing the individual pieces with a scrim. This may result in significant resin absorption due to infusion, and the cut foam panels and balsa wood may end up being more flexible than is really useful.

There is a need to have composite structures formed from low density strips able to be contoured in the direction of the composite along the length of the strips and able to be contoured in both directions along the strip length and perpendicular to the strip length for such complex shapes such as a dome or saddle shape.

SUMMARY

A process for forming a fiber reinforced core panel which is able to be contoured includes the following steps in order. First, slice a sheet of a low density material a plurality of times in a first direction of the sheet on at least one side, where the slices extend through only a portion of the thickness of the sheet, then divide the sheet in the second direction of the sheet into a series of low density strips having at least three faces (major face, a first edge face, a second edge face, and optionally a minor face) where the slices in the sheet form a series of cuts in the major or minor face of the low density strips. Next, arrange the series of low density strips to form a core panel and thread a continuous fibrous reinforcement sheet through the low density strips such that the fibrous reinforcement sheet is disposed between adjacent strips and adjacent to the major or minor faces of the low density strips.

BRIEF DESCRIPTION OF FIGURES

The present invention will now be described by way of example only, with reference to the accompanying drawings which constitute a part of the specification herein and in which:

FIG. 1 is a perspective view of a composite structure according to one embodiment where the composite structure contains curvature along the Y direction.

FIG. 2 is a perspective view of a fiber reinforced core panel according to one embodiment.

FIG. 3 is an end view of one embodiment of a fiber reinforced core panel having strips with profiles in a trapezoid shape having 4 faces.

FIG. 4 is an end view of one embodiment of a fiber reinforced core panel having strips with profiles in a square shape having 4 faces.

FIG. 5 is an end view of another embodiment of a fiber reinforced core panel having strips with profiles in a triangle shape having 3 faces.

FIG. 6 is an end view of another embodiment of a fiber reinforced core panel having strips with profiles having 4 faces, 2 of which are curved.

FIGS. 7A and 7B are end views of strips having different profiles.

FIG. 8 is a perspective view of a composite structure according to one embodiment where the composite structure contains curvature along the Y direction and the X direction forming a dome shape. The low density strips are arranged in a repeating pattern of with strips having profiles of trapezoids and triangles.

FIG. 9 is an end view of another embodiment of the fiber reinforced core panel able to be contoured in the X direction.

FIG. 10 is a perspective view of a low density sheet having a series of slices on both sides of the sheet, where the slices form planes that are parallel to one another.

FIG. 11 is a perspective view of a low density sheet having a series of slices on both sides of the sheet, where the slices form planes that are not parallel to one another.

FIG. 12 is a profile view of one embodiment of the strip containing a series of cuts in the major and minor faces of the strip, where the cuts form planes that are parallel to one another.

FIG. 13 is a profile view of one embodiment of the strip containing a series of cuts in the major and minor faces of the strip, where the cuts form planes that are not parallel to one another.

FIG. 14 is a profile view of one embodiment of the strip containing a series of cuts in the minor face of the strip, where the line formed by the cut on the surface of the minor face is not perpendicular to the longitudinal axis of the strip.

FIG. 15 is a profile view of one embodiment of the strip containing a series of cuts in the minor face of the strip, where the cuts vary in depth along the length of the strip.

FIG. 16 is a profile view of one embodiment of the strip containing a series of cuts in the minor face of the strip, where the cuts vary in frequency along the length of the strip.

FIG. 17 is a profile view of one embodiment of the strip containing a series of cuts in the minor face of the strip, where the cuts are tapered.

FIG. 18 is a profile view of one embodiment of the fiber reinforced core panel (not showing the reinforcing fabric), where the cuts in the strips vary in frequency from strip to adjacent strip.

FIG. 19 is a profile view of one embodiment of the strip containing a series of cuts in the minor face of the strip, where the cuts contain a fabric layer.

FIG. 20 is a profile view of one embodiment of the fiber reinforced core panel (not showing the reinforcing fabric), where the cuts on one side of the panel are aligned.

FIG. 21 is a profile view of one embodiment of the fiber reinforced core panel (not showing the reinforcing fabric), where the cuts on one side of the panel are staggered.

FIG. 22 is an end view of one embodiment of the fiber reinforced core panel illustrating the placement of the reinforcing fabric relative to the low density strips.

FIG. 23 is an end view of another embodiment of a fiber reinforced core panel having stabilizing layers on the panel.

DETAILED DESCRIPTION

Referring now to the Figures, and in particular, to FIG. 1, there is shown a composite structure 10 generally including a plurality of low density strips 100, a continuous fibrous reinforcement sheet 200, a first outer skin 300, a second outer skin 400, and a polymeric matrix 500. The composite structure 10 contains a curvature in the direction along the length of the strips, designated as the Y direction. The fibrous reinforcing layer 200 and the low density strips 100 (with additional optional layers and materials) form the fiber reinforced core panel 11. The low density strips 100 have longitudinal axes that are substantially parallel to each other. The low density strips 100 contain a series of cuts 150 along the surfaces of the strips facing the first side 11a and the second side 11b of the fiber reinforced core panel 11. The first outer skin 300 is disposed on a first side 11a of the reinforced core panel 11. The second outer skin 400 is also a flexible material disposed across the second side 11b of the fibrous reinforced core panel 11 opposite from the first outer skin 300. The polymeric matrix 500 is typically a resin material such as a thermoset polymer. However, other polymeric resins could be used such as a thermoplastic or a material polymerized in position. The polymeric matrix impregnates at least the continuous fibrous reinforcement sheet 200, the first outer skin 300, the second outer skin 400, and the series of cuts 150 in the low density strips 100. The fiber reinforced core panel 11 is shown in greater detail in FIG. 2.

Referring now to FIG. 2, the low density strips 100 have at least three faces and a length to width aspect ratio of at least about 5:1, preferably at least about 10:1. The low density strips 100 are aligned in the panel 11 such that the longitudinal axes of the low density strips 100 are substantially parallel. The low density strips 100 have a density lower than the polymeric matrix 500, preferably having a density of between about 0.01 and 0.2 g/cm$^3$, more preferably between about 0.02 and 0.07 g/cm$^3$.

Referring now to FIGS. 3-6, the cross-sectional profile of the low density strips 100(a, b) may have any suitable profile; profiles include, but are not limited to profiles having three or four faces. The faces may be straight or curved. The faces of the strip 100 that are next to the adjacent strips 100 in the core panel 11 are designated as edge faces 101 and 103. The edge faces 101 and 103 preferably mate to the adjacent edge faces 101 and 103 in the adjacent strips as shown in FIGS. 3-6. Having the edge faces 101 and 103 mate creates a high strength composite structure 10. The widest face positioned with a face on the first side 11a or second side 11b of the core panel 11 is designated as the major face 105.

In one embodiment, the strips 100 in the core panel 11 are arranged such that they form a relatively flat panel. The strips 100 are flipped relative to the adjacent strips 100 (strips 100a compared to strips 100b) making the major face 105 of a particular strip 100a, b on the opposing side of the core panel 11 compared to the major face 105 of the adjacent strip 100a, b. If the strips are four sided, as shown in the trapezoid profile shaped strips 100 in FIG. 3, the face opposite to the major faces 105 is designated as the minor face 107. (In the case of the strips having a square shape as shown in FIG. 4, the orientation does not matter as all faces and angles are the same). The major face 105 and minor face 107 are generally parallel to one another. In one embodiment, the ratio of lengths of the major to minor faces is greater than 2:1, more preferably greater than 5:1. If the strips are three sided, as the triangle shaped strips shown in FIG. 5, there is no minor face and the point or edge opposite the major face 105 is designated as point 109. An embodiment of panel 11 where the strips 100 have four faces with two of the faces being curved is shown in FIG. 6.

Referring to FIGS. 7A and 7B, the angle α formed by the edge face 101 and the major face 105 is preferably acute, meaning that it is less than 90 degrees. Also preferred, the angle β formed by the edge face 103 and the major face 105 is also acute. The sum of angles α and β is preferably less than 180 degrees. If any of the faces 101, 103, 105 are not straight, then to determine the angles α and β one creates an imaginary line connecting the end points of the line as shown in FIG. 7B. The strips may all have the same cross-sectional profile or the profiles and dimensions may vary from one strip to another. To provide curvature in the direction across the triangles, one may change the alpha and beta angles on the triangles facing the first side of the panel compared to the triangles facing the second side of the panel. This would also apply to shapes other than triangles.

In one embodiment, the composite 10 contains curvature along the X direction, the direction perpendicular to the length of the strips (the "X" direction is shown, for example, in FIG. 1). To obtain curvature along the X direction, the profiles and dimensions of the strips may vary from one strip to another. In one embodiment, the strips 100(a,b) with alternating cross-sections may be used to create panels that have a natural contour in the finished product. FIG. 8 illustrates a fiber reinforced core panel 10 having curvature in both the X and the Y direction, with the curvature in the X direction formed from using an alternating arrangement of triangles and trapezoids having different alpha and beta angles. The natural contour allows the panel to drape to a curved mold with minimal gaps between adjacent strips to avoid excess polymeric matrix 500 (resin) pickup. Another method of achieving this natural contour in the X direction is changing the angles in the adjacent cross-sections. A greater change in angle between adjacent strips gives a greater contour. Additional contour can be accommodated in the X or Y direction by using flexible foam strips such as polyethylene or polypropylene. Strips 100(a,b) with alternating segments of rigid foam and flexible foam may be used.

In another embodiment of gaining curvature in the X direction, the strips 100 and the reinforcing sheet 200 are secured to form a fiber reinforcement core panel 11 in a manner that can allow the core panel 11 to bend in either the direction of the first side 11a or the second side 11b such as shown in FIG. 9. In this embodiment, the reinforcing sheet 200 is secured to the major face 105 and the edge face 103 of each of the strips 100. The edge face 101 is left unbonded. In this matter, the fiber reinforcing core panel 11 can hinge between the edge face 103 and the major face 105, so that the fiber reinforced core panel 11 can bend into an arc or angle.

The low density strips 100 may be formed from any suitable materials including but not limited to foam (closed-cell or open-cell), balsa wood, and sealed plastic bottles. The foam may be, for example, polyurethane foam, expanded polystyrene foam, expanded polyethylene foam, expanded polypropylene foam, or a copolymer thereof. The strips may be formed of a rigid foam such as PVC, styrene acrylonitrile (SAN), or polymethacrylimide (PMI); a fire resistant foam such as phenolic; or hollow tubes made of plastic, metal, paper, or the like. In a potentially preferred embodiment, the strips 100 are composed of closed-cell foam. The type of closed-cell foam may be selected on the basis of processing parameters such as pressure, temperature, or chemical resistance or other desired panel properties, such as water or fire resistance, thermal insulation or light transmission.

The strips 100 preferably have resin absorption of less than about 250 g/m$^2$ under vacuum pressure as measured by weight change and a deformation of less than 10% under a vacuum of 101 kPa as measured by thickness change. The strips 100 may also have a film or coating on at least one of the surfaces to reduce resin absorption or improve bonding between foam strips and reinforcement. The film or coating may be applied in any known manner and may include PVC, polyolefins, polyurethanes, and other polymers. Low composite structure 10 density is one of the key performance parameters for composite sandwich panels. Resin pickup by foam or other core materials can be significant. Closed cell foams have moderate resin absorption at the surface. Since the amount of foam surface area is increased by 100% to 200% when using elongated foam strips, there is a need in these structures to reduce the surface absorption of resin (polymeric matrix 500). One method by which this can be achieved is by sealing off the foam strips from the resin supply using a PVC shrink wrap film. Covering the foam strips with an impermeable layer of film serves to reduce the resin pickup in the foam and also serves to minimize the resin content in the resultant structure. Preferably, the surface coating on at least one face of the strips 100 is impervious to resin. Some films and coatings may interfere with adhesion between the foam surface of the strips 100 and the reinforcement sheet 200. Some covering films and coatings may reduce the bonding between the foam and reinforcement, but the mechanical properties are mainly developed by the reinforcement. Alternatively, the impermeable layer could be chosen to enhance the bond between the low density strips 100 and the reinforcement sheet 200, improving the mechanical properties of the composite structure 10.

The strips 100 can be a unitary material, a collection of pieces, and/or reinforced material. In the embodiment where the strips are a collection of pieces, the pieces can be individual free pieces, or pieces held together such as with an adhesive.

The core panel 11 may contain curvature or contour in the Y direction (and optionally curvature in the X direction also). The Y direction, for example shown in FIG. 1, is the direction along the length (longitudinal axis) of the low density strips 100. In one embodiment, the low density strips may contain a series of cuts that originate in the major and/or minor faces of the strips and extend through only a portion of the thickness of the strips (thickness being defined as the distance between the major face 105 and minor face 107, or in the case where there are only three faces, thickness is the distance between the major face 105 and the point 109). The transverse direction, X, (perpendicular to the length of the strips) is the weaker direction, primarily due to buckling of the trusses.

The series of cuts may be formed in the strips in a number of ways. In one preferred embodiment, a sheet of closed cell polyurethane foam is sliced, creating cuts all the way across the sheet. This is shown, for example, in FIGS. 10 and 11. Then the sliced sheet is cut into the desired low density strip dimensions. Low density strips 100 shown in FIG. 12 may be formed using the cut sheet of FIG. 10. Low density strips 100 shown in FIG. 13 may be formed using the cut sheet of FIG. 11. These already cut strips are then arranged and wrapped with the reinforcing fabric 200. In one embodiment as shown in FIG. 10, the sheet of foam was sliced creating cuts about 0.0625 in wide and about 0.625 in deep every two inches. The cuts were created in the top and bottom of the panel, and the top and bottom slots were offset one half of the interval distance so that each bottom slot was in the middle of two top slots and vice versa. In another embodiment, low density strips are obtained first and then each is then sliced to create a series of cuts. These already cut strips are then arranged and wrapped with the reinforcing fabric 200.

In one embodiment, the strips 100 only have cuts on the major face or the minor face such as shown, for example, in FIGS. 14-18. In another embodiment, the strips 100 have cuts in the major face and the minor face such as shown, for example, in FIGS. 12, 13, 17, and 19. In another embodiment, the major and minor faces of the strips are cut such that when the strips are assembled into a core panel 11, the cut faces all face the same side (11a or 11b) of the core panel 11. This is shown, for example, in FIG. 20 where the strips are in an alternating pattern of a strip having cuts in the major face and a strip having cuts in the minor face.

The series of cuts 150 form planes in the low density strips 100. The planes may be perpendicular to the cut face (major or minor) or non-perpendicular to the cut face. The planes formed by the cuts may change in angle comparing the major to the minor face, from one low density strip to an adjacent strip, or along the length of one strip. FIG. 12 illustrates a low density strip having a series of cuts 150 in both the major face 105 and minor face 107, where the cuts 150 are perpendicular to the cut face. Preferably, the cuts on the major and minor faces are parallel to one another.

FIG. 13 illustrates a low density strip having a series of cuts 150 in both the major face 105 and minor face 107, where the cuts 150 are not perpendicular to the cut face. Further, the cuts in the major face are not parallel to the cuts in the minor face. When the slots are cut at an angle this may allow the cuts to close up slightly as vacuum is applied to the part during infusion. The force on the cuts makes the gaps close reducing the open volume which could be occupied by resin.

The line formed on the surface of the face that is cut (also referred to as the cut face) is either perpendicular to the sides of the cut face or non-perpendicular to the edges of the cut face. FIGS. 12 and 13 illustrate embodiments where the line formed by the cut on the cut face is perpendicular to an edge of the cut (major or minor) face and FIG. 14 illustrates an embodiment where the line formed by the cut on the surface of the cut face (this case the minor face 107) is not perpendicular to the longitudinal axis of the strip. The angle of the line formed by the cuts on the cut face may change comparing the major to the minor face, from one low density strip to an adjacent strip, or along the length of one strip.

The depth of the cuts is selected for the desired properties in the final product with greater depth cuts generally resulting in the ability to curve to a tighter radius. In one embodiment, the cuts on average have a depth of between about 10 and 90% of the thickness of the low density strips 100, more preferably between about 20 and 75%. FIG. 12 illustrates where the embodiment where the cut depth on all of the cuts (in both the major and minor faces) are approximately equal. The depth of cuts may change from the major to the minor face, from one low density strip to an adjacent strip, or along the length of one strip. FIG. 15 illustrates the embodiment where the depth of cuts changes along the length of the low density strip 100.

The frequency of the cuts is selected for the desired properties in the final product with greater frequency of cuts generally resulting in the ability to curve to a tighter radius. In one embodiment, the cuts on average have an average frequency of between about 1 cut per 10 inches and 5 cuts per inch. FIG. 16 illustrates the embodiment where the depth of cuts changes along the length of the low density strip 100. FIG. 18 illustrates the embodiment where the depth of cuts changes from strip to adjacent strip along one side of the core panel 11 (the continuous fibrous reinforcement sheet 200 is not shown so the cuts 150 in the strips 100 are more visible).

The cuts 150 in the low density strips 100 may have any suitable width (width of the space removed from the strip by the cut in the direction along the length of the strip). The cut width, in one embodiment, is minimized so as to minimize extra resin pick-up during infusion. In one embodiment, the width of the cut is approximately constant throughout the depth of the cut, while in another embodiment, the width of the cut decreases through the depth of the cut forming a tapered cut. This is shown in FIG. 17. The cut width and shape may change from the major to the minor face, from one low density strip to an adjacent strip, or along the length of one strip.

In one embodiment, the cuts are filled with a plurality of fibers or fabric. If the cuts are filled with fibers, the fibers may be introduced during any suitable manufacturing step, including incorporating the fibers into the cuts before the strips are formed into the core panel, or during infusion where the resin infused contains fibers. FIG. 19 illustrates the embodiment where the cuts 150 are filled with a fabric. The fibers or fabric serve to further reinforce and strengthen the core panel 11. The fabric may be any suitable fabric, including but not limited to those fabrics and textiles described as being suitable for the continuous fibrous reinforcement sheet 200.

The cuts 150 in the low density strips 100 may be arranged such that when the low density strips 100 are formed into the core panel 10, the cuts are aligned or are staggered as illustrated in FIGS. 20 and 21 (which do not show the continuous fibrous reinforcement sheet 200 so as to more clearly show the cuts in the strips). FIG. 20 illustrates the embodiment where the cuts are aligned on one side of the panel. The cuts being "aligned" mean that between adjacent strips, the cut lines (on the cut faces) from one strip start near where the cut lines end on the adjacent strip (this is considered being aligned even with the reinforcement sheet 200 between the strips). In another embodiment as shown in FIG. 21, the cuts in the low density strips are staggered meaning that the cut lines are offset relative to one another. This may help ensure complete resin penetration in the core panel 10. Though embodiments were shown having all aligned cuts or all staggered cuts, the core panel may contain a mixture of both of these styles along one side of the panel in different areas. Additionally, the second side of the panel may also contain aligned cuts, staggered cuts, or a mixture of both.

In addition to providing curvature, the series of cuts 150 may also contain additional structural benefits. When resin is impregnated into the panel 11, the cuts fill with resin and may contribute to the structural strength of the panel. The infused cuts form reinforcement ribs in the transverse direction thus reducing the truss buckling. The cuts 150 may also add in ensuring complete resin penetration and quicker resin penetration.

Referring back to one embodiment shown in FIG. 4, the continuous fibrous reinforcement sheet 200 is threaded (also referred to as wrapped) through the low density strips 100 such that the fibrous reinforcement sheet 200 is disposed between to the edge faces 101, 103 of the adjacent strips 100 and along the major faces 105 of the low density strips 100. In one embodiment, the reinforcement sheet 200 forms at least about sixty five percent (65%) of the surface area of the first side 11a and the second side 11b of the fibrous reinforced core panel 11. The reinforcement sheet 200 is not continuous on the first side 11a or the second side 11b of the core panel 11.

The continuous fibrous reinforcing sheet 200 may be a woven, knit, bonded textile, nonwoven (such as a chopped strand mat), or sheet of strands. The fibrous reinforcing sheet 200 can be unidirectional strands such as rovings and may be held together by bonding, knitting a securing yarn across the rovings, or weaving a securing yarn across the rovings. In the case of woven, knit, warp knit/weft insertion, nonwoven, or bonded the textile can have yarns or tape elements that are disposed in a multi-(bi- or tri-) axial direction. The yarns or fibers of the reinforcing sheet 200 may be, for example, fiberglass, carbon, polyester, aramid, nylon, natural fibers, and mixtures thereof. Preferably, the continuous fibrous reinforcement sheet 200 is a multi-axial knit. A multi-axial knit has high modulus, non-crimp fibers that can be oriented to suit a combination of shear and compression requirements. The fibers may be monofilament, multifilament, staple, tape elements, or a mixture thereof. Glass rovings are preferred due to their low cost, relatively high modulus, and good compatibility with a variety of resins. The fibers used in the reinforcement sheet 200 have a high strength to weight ratio. Preferably the fibers have strength to weight ratio of at least 1 GPa/g/cm$^3$ as measured by standard fiber properties at 23° C. and a modulus of at least 70 GPa.

The reinforcing sheet 200 can also be combined with thermoset or thermoplastic resin before being combined with the foam strips. The resin can either be impregnated in the fibers (prepreg), layered in a film form next to the fiber sheets (such as SPRINT® by Gurit), or intermingled with the reinforcement fibers (TWINTEX® by Saint Gobain). Pre-combining the resin and reinforcement has the advantage of being used in dry processes with similar skins. These processes typically have higher control over fiber resin ratios and thus the potential for lower weight structures. The process is also more controlled with fewer voids or defects. The downside of these prepreg processes is higher material acquisition costs, controlled storage is often needed, and processing typically requires higher capital outlay (heating, autoclave, etc.).

Referring now to the embodiment shown in FIG. 22, the strips 100a and 100b are aligned with the major surfaces 105 of strips 100a in the first side 11a of the panel, and major faces 105 of the strips 100b in the second side 11b of the panel. Each of the major faces 105 have a first major face edge 102 and a second major face edge 104. In this embodiment, the fiber reinforced sheet 200 progresses in the first face 11a of the panel 11 along the major face 105 of the strip 100a from the first major face edge 102 to the second major face edge 104. The fiber reinforced sheet 200 then turns to proceed between the strip 100a and the strip 100b until it emerges in the second face 11b of the panel 11 at the first major face edge 102 of the strip 100b. The fiber reinforced sheet 200 then progresses in the first face 11b along the major face 105 of the strip 100b from the first major face edge 102 to the second major face edge 104. The fiber reinforced sheet 200 then progresses between the strip 100b and the next strip 100a until it emerges from the panel 11 in the first face 11a at the first major face edge 102 of the strip 100a. This progression is repeated continuously down the length of the panel 11.

One important element of some of the embodiments is the angle between the point in which the reinforcing fiber sheet 200 begins traveling between the strips 100a and 100b until it reaches its exit point at the opposite side of the panel 11. To illustrate this angle, the first imaginary line 151 is drawn from the second major face edge 104 of strip 100b and the first major face edge 102 of the strip 100a. A second imaginary line 152 is drawn from the second major face edge 104 of strip 100b and the first major face edge 102 of the strip 100b. The angle between the first imaginary line 151 and the major face 105 of the strip 100a is $\Theta_a$, and the angle between the major face 105 of strip 100a to the second imaginary line 152 is $\Phi_a$, the angle between the major face 105 of strip 100b and the second imaginary line 152 is $\Theta_b$, and the angle between the major face 105 of strip 100b and the first imaginary line 151 is $\Phi_b$. In one embodiment, angles $\Theta_b$ and $\Theta_a$ are chosen such that they add up to less than 180 degrees. Likewise, in one embodiment, the angles $\Phi_a$ and $\Phi_b$ are selected to add up less than 180. This configuration is also facilitated when the angels $\Theta_a$ and $\Phi_a$ add up to be less than 180 degrees and when the angles $\Theta_b$ and $\Phi_b$ also add up to be less than 180 degrees. In order to design a panel 11 that curves about the first surface 11a, and angles $\Theta_a$ and $\Phi_a$ add up to be less than the sum of angles $\Theta_b$ and $\Phi_b$. In order to accomplish a curve of the panel 11 above the second surface 11b, the angles $\Theta_b$ and $\Phi_b$ add to be greater than the sum of angle $\Theta_a$ and $\Phi_a$.

To form the wrapped configuration of the panel 11, the reinforcing sheet 200 is positioned across the edge face 101, moves across the major face 105, then the edge face 103 of a first strip (which is also the edge face 101 of the adjacent strip). The reinforcement fabric 200 continues around the major face 105 of the adjacent strip and then the edge face 103 (which is also the edge face 101 of the next strip). This progression is repeated along the length of the fiber reinforcing core panel 11 to create a situation where the fiber reinforcing sheet 200 covers the surfaces 101, 105, 103 of the strips 100. In one embodiment, the reinforcement sheet forms at least about sixty five percent (65%) of the surface area of the first side 11a and the second side 11b of the core panel 11 and provides angular support between the first surface 11a and the second surface 11b. Additionally, the surface area of the major faces 105 covered by the reinforcing sheet 200 will be greater than the surface area of the minor faces 107, if there are minor surfaces. In a second embodiment, the fibrous reinforcing sheet 200 covers at least about eighty percent (80%), or preferably at least about ninety percent (90%), of the surface area of the first 11a and second 11b side of the panel 11. The treading (or wrapping) may be done after or during arranging the low density strips to form a core panel.

The strips 100 and reinforcing sheet 200 of fiber reinforcing core panel 11 at times may need to be secured prior to assembly with the other components of the composite structure 10. Referring now to FIG. 23, the fiber reinforced core panel 11 is secured by the addition of a first face stabilizer 600 secured to the reinforcing sheet 200 and strips 100 across the first surface 11a of the fiber reinforcing core panel 11. Additionally, a second face stabilizer 700 may be secured to the reinforcing sheet 200 and strips 100 across the second surface 11b of the fiber reinforcing core panel 11. The second stabilizing layer 700 may be made of the same or different materials and construction as the first stabilizing layer 600. Typically, the face stabilizers 600 and 700 are of very open fabric, such as a scrim. The stabilizing layers 600, 700 may also be fibrous layers, unidirectional fibers, a thermoplastic film, an adhesive layer, or mixtures thereof. An adhesive material may be used to secure the face stabilizers 600, 700 to the strips 100 and reinforcing sheet 200. The adhesive material may be an additional layer added between the stabilizing layer and the panel 11 or may be incorporated into the stabilizing layer 600, 700. In one embodiment, the face stabilizer 600, 700 can be a film, preferably with open apertures to allow flow of the resin matrix 500 throughout the composite structure 10 prior to setting the resin matrix 500. The face stabilizer 600, 700 may be made of elastic yarns or fibers. Additionally, the fiber reinforcing core panel 11 may contain a stabilizing layer on only one side of the core 11. The face stabilizers are an open material, with low surface area, and are preferably a light weight material, such as lighter than the outer skin layers 300, 400.

In another embodiment, the integrity of the fiber reinforced core panel 11 is created by bonding the reinforcing sheet 200 to the strips 100 prior to disposing the polymeric matrix in the composite structure 10. In such an embodiment, the reinforcement sheet can be secured to the strips 100 with an adhesive, and the adhesive can be disposed in a pattern such as stripes or dots to leave a portion of the reinforcing fabric 200 open. In another embodiment, the reinforcement sheet can be secured to the strips through the inclusion of a nonwoven adhesive web.

Referring back to FIG. 2, the composite structure 10, in one embodiment, includes a first outer skin 300 and a second outer skin 400. In another embodiment, the composite structure may include only one outer skin 300 or 400. The first outer skin 300 may be made of the same or different materials and/or constructions compared to the second outer skin 400. The skins may be made up of one or more than one layers of fibers. Preferably, the outer skin layers are made up of at least two layers of fibers. Any suitable fiber may be used in the outer skins 300, 400, including but not limited to organic or inorganic structural reinforcing fabrics such as fiberglass, carbon fibers, aramid fibers such as is available under the name KEVLAR®, linear polyethylene or polypropylene fibers such as is available under the name SPECTRA®, thermoplastic tape fibers, polyester fibers, nylon fibers, or natural fibers. The materials and constructions may also vary between the layers in the skins 300, 400.

The outer skin layers 300, 400 may contain layers of woven, knit, bonded textile, nonwoven fibers, or sheet of strands such as rovings. The fibrous reinforcing sheet can be unidirectional strands such as rovings, and the unidirectional strands can be held together by bonding, knitting a securing yarn across the rovings, or weaving a securing yarn across the rovings. In the case of woven, knit, warp knit/weft insertion, nonwoven, or bonded the textile can have yarns or tape elements that are disposed in a multi-(bi- or tri-) axial direction. The yarns or fibers of the reinforcing sheet can be fiberglass, carbon, polyester, aramid, natural fibers, and mixtures thereof. Preferably, the continuous fibrous reinforcement sheets are a multi-axial knit. A multi-axial knit has high modulus, non-crimp fibers that can be oriented to suit a combination of shear and compression requirements. The fibers may be monofilament, multifilament, staple, tape elements, or a mixture thereof.

The composite panel may be contoured or bent at any point during the manufacture. In one embodiment, the composite panel is contoured in a mold during the resin infusion and curing process. In another embodiment, the panel is contoured before the skin layers are applied (when it is a fiber reinforced core panel).

In one embodiment, a composite panel 10 can be made from two or more adjacent reinforced core panels 11. The reinforced core panels 11 can be arranged with the strips 100 in each panel 11 parallel to one another or turned at 90 degrees to one another. An additional layer of reinforcement like as used in the outer skins 300, 400 may be added between the reinforced core panels 11. Outer skin layers 300 and 400 are then added to the top and bottom of the reinforced core panels 11.

The composite structure 10 is impregnated or infused with a polymeric matrix 500 of resin which flows, preferably under differential pressure, through at least a portion of (the reinforcing sheet 200, the outer skins 300, 400, and optional stabilizing layers 600, 700). Preferably, the resin flows throughout all of the reinforcing materials (the reinforcing sheet 200, the outer skins 300, 400, and optional stabilizing layers 600, 700) and cures to form a rigid, load bearing structure. Resin such as a polyester, a vinylester, an epoxy resin, a bismaleimide resin, a phenol resin, a melamine resin, a silicone resin, or thermoplastic monomers of PBT or Nylon etc. may be used. Vinylester is preferred due to its moderate cost, good mechanical properties, good working time, and cure characteristics. The reinforcement fabric can also be combined with resin before wrapping around the foam strips. Resins include b-staged thermosets as in thermoset prepregs or thermoplastic resins as in tape yarns, commingled yarns, or unidirectional sheets.

Infusing the resin throughout the porous reinforcing fibers under differential pressure may be accomplished by processes such as vacuum bag molding, resin transfer molding or vacuum assisted resin transfer molding (VARTM). In VARTM molding, the core and skins are sealed in an airtight mold commonly having one flexible mold face, and air is evacuated from the mold, which applies atmospheric pressure through the flexible face to conform the composite structure 10 to the mold. Catalyzed resin is drawn by the vacuum into the mold, generally through a resin distribution medium or network of channels provided on the surface of the panel, and is allowed to cure. The composite structure 10 may have flow enhancing means such as, but not limited to: grooves or channels cut into the major and minor surfaces of the strips; a network of grooves on all sides of the strips; additional elements in the reinforcement fabric such as voids or flow enhancing yarns. Additional fibers or layers such as surface flow media can also be added to the composite structure to help facilitate the infusion of resin. A series of thick yarns such as heavy rovings or monofilaments can be spaced equally apart in one or more axis of the reinforcement to tune the resin infusion rate of the composite panel. In one example polyester monofilaments were spaced about 20 mm apart along the length of the reinforcement sheet. The sheet was then wrapped around the foam strips and infused with resin in the direction of the foam strips. The infusion rate was noticeably faster than when using reinforcement without the added monofilaments.

In one embodiment, the process for forming a fiber reinforced core panel comprises the following steps (these steps may be in order, may be out of order, may have additional steps not listed here between steps or after the listed steps, or may have several steps occurring at the same time):

(a) obtaining sheet of a low density material having a first direction, a second direction perpendicular to the first direction, a thickness, an upper side and a lower side;

(b) slicing the sheet of the low density material a plurality of times in the first direction of the sheet on at least one side, wherein the slices extend through only a portion of the thickness of the sheet;

(c) dividing the sheet in the second direction of the sheet into a series of low density strips having at least three faces and having a length to width aspect ratio of at least 5:1, wherein the cross-section of each strip has a major face, a first edge face, a second edge face, and optionally a minor face, wherein the slices in the sheet form a series of cuts in the major or minor face of the low density strips;

(d) arranging the series of low density strips to form a core panel having a first side and an opposing second side such that the longitudinal axis of the low density strips are substantially parallel and the major face of each strip is disposed within the first or second side of the core panel, wherein the major face of each strip is disposed within an opposite face of the core panel than the major face of the adjacent strips; and, (e) threading a continuous fibrous reinforcement sheet through the low density strips such that the fibrous reinforcement sheet is disposed between adjacent strips and adjacent to the major or minor faces of the low density strips.

EXAMPLE

A process for forming the fiber reinforced core panel and composite structure began with a sheet of closed cell polyurethane foam. The one inch thick sheet of foam was then then sliced creating cuts about 0.0625 in wide and about 0.625 in deep every two inches. The cuts were created in the top and bottom of the panel, and the top and bottom slots were offset one half of the interval distance so that each bottom slot was in the middle of two top slots and vice versa. A drawing of the sliced panel is illustrated as FIG. 10.

Next, the sheet of foam was cut into sixteen (16) inch long strips having 1 inch height, 1.28 inch width major side, 0.125 inch minor side and a trapezoid shape. The angles of the trapezoid were 60 degrees from the base to the adjacent sides. A drawing of the low density strip formed with the series of cuts is illustrated as FIG. 12. The strips had a 65 gram/m$^2$ glass fiber nonwoven facer on the major and minor sides. The trapezoid shaped profile had 2 faces that were parallel to one another. The longer of these faces was designated as the major face and the shorter was designated the minor face. The other two faces were designated the edge faces.

The strips were laid side by side with their longitudinal axes aligned such that the major face alternated between facing upwards and downwards every other strip. The edge faces of the strips were next to the edge faces of strips adjacent to that strip.

A continuous fibrous reinforcing sheet made of E-glass rovings in a 12 oz/yd$^2$ double bias (+/−45 degree) construction (EBX1200® from Vectorply Corporation) was threaded through the strips. The reinforcing sheet was threaded such that the reinforcing sheet was adjacent to the edge faces and the major face such as shown in FIG. 3. This formed the fiber reinforced core panel.

Stabilizing layers were added to either side of the panel to hold the strips and reinforcing sheet in place until the next operation. The stabilizing layers were lightweight fiberglass scrims (STABILON® from Milliken & Company). The stabilizing layers were applied using a lightweight hot-melt nonwoven adhesive (PA1541A/1® from Spunfab).

The panel including the stabilizing layers, under its own weight, resulted in a radius of curvature of approximately 1.7 m. Creating a panel without creating a series of cuts in the strips resulted in a panel with little or no measurable curve.

Next, outer skin layers comprised of 4 layers of E-glass rovings in a 12 oz/yd2 double bias (+/−45 degree) construction (EBX1200® from Vectorply Corporation) were laid on either side of the panel.

Finally, the panel with the outer skins was placed in a mold and secured under a vacuum bag. The air was evacuated and a catalyzed vinyl ester resin (CCP ARMORSTAR IVE-XC400® available from Composites One, LLC) was infused throughout the core panel and outer skins until there were no obvious air voids.

The mold was released from the composite structure. The resultant sandwich structure would be useful in applications such as wind turbine blades, boat decks, train floors or other structures were high stiffness and low weight are valued.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A process for forming a fiber reinforced core panel comprising:
   (a) obtaining a sheet of a low density material having a first direction, a second direction perpendicular to the first direction, a thickness, an upper side and a lower side;
   (b) slicing the sheet of the low density material a plurality of times in the first direction of the sheet on at least one side to form slices in the sheet, wherein the slices extend through only a portion of the thickness of the sheet;
   (c) dividing the sheet in the second direction of the sheet into a series of low density strips having at least three faces and having a length to width aspect ratio of at least 5:1, wherein the cross-section of each strip has a major face, a first edge face, a second edge face, and optionally a minor face, wherein the slices in the sheet form a series of cuts in the major or minor face of the low density strips;
   (d) arranging the series of low density strips to form a core panel having a first side and an opposing second side such that the longitudinal axis of the low density strips are substantially parallel and the major face of each strip is disposed within the first or second side of the core panel, wherein the major face of each strip is disposed within an opposite face of the core panel than the major face of the adjacent strips; and,
   (e) threading a continuous fibrous reinforcement sheet through the low density strips such that the fibrous reinforcement sheet is disposed between adjacent strips and adjacent to the major or minor faces of the low density strips.

2. The process of claim 1, wherein the series of cuts in the low density strips form planes that are not perpendicular to the major or minor face of the low density strips.

3. The process of claim 1, wherein the series of cuts in the low density strips form planes that are perpendicular to the major or minor face of the low density strips.

4. The process of claim 1, wherein the low density strips are arranged such that the series of cuts on each low density strip are on the face of the low density strips facing the first side of the core panel.

5. The process of claim 4, wherein the series of cuts on the low density strips form aligned cuts or staggered cuts on the first side of the core panel.

6. The process of claim 1, wherein the slices in the sheet form a series of cuts in the major face and minor face of the low density strips.

7. The process of claim 1, wherein the continuous fibrous reinforcement sheet is threaded through the low density strips such that the fibrous reinforcement sheet is disposed between adjacent strips and adjacent to the major faces of the low density strips and forms at least about sixty five percent (65%) of the surface area of the first side of the core panel and at least about sixty five percent (65%) of the surface area of the second side of the core panel.

8. The process of claim 1, further comprising between the steps of (b) and (c) the step of inserting a fabric layer into at least a portion of the slices in the low density sheet.

9. The process of claim 8, wherein the fabric layer is selected from the group consisting of a knit, woven, non-woven, and unidirectional.

10. The process of claim 1, further comprising between the steps of (c) and (d) the step of inserting a fabric layer into at least a portion of the cuts in the low density strips.

11. The process of claim 1, further comprising bending the fiber reinforced core panel along the direction parallel to the longitudinal axes of the low density strips after step (e).

12. A process for forming a composite structure comprising:
   (a) obtaining a sheet of a low density material having a first direction, a second direction perpendicular to the first direction, a thickness, an upper side and a lower side;
   (b) slicing the sheet of the low density material a plurality of times in the first direction of the sheet on at least one side to form slices in the sheet, wherein the slices extend through only a portion of the thickness of the sheet;
   (c) dividing the sheet in the second direction of the sheet forming a series of low density strips having at least three faces and having a length to width aspect ratio of at least 5:1, wherein the cross-section of each strip has a major face, a first edge face, a second edge face, and optionally a minor face, wherein the slices in the sheet form a series of cuts in the major or minor face;
   (d) arranging the series of low density strips to form a core panel having a first side and an opposing second side such that the longitudinal axis of the low density strips are substantially parallel and the major face of each strip is disposed within the first or second side of the core panel, wherein the major face of each strip is disposed within an opposite face of the core panel than the major face of the adjacent strips;
   (e) threading a continuous fibrous reinforcement sheet through the low density strips such that the fibrous reinforcement sheet is disposed between adjacent strips and adjacent to the major or minor faces of the low density strips thereby forming a fiber reinforced core panel;
   (f) placing a first outer skin layer on the first side of the fiber reinforced core panel;
   (g) flowing a polymeric matrix into at least a portion of one of the first outer skin and the continuous fibrous reinforcement sheet; and,
   (h) curing the polymeric matrix.

13. The process of claim 12, wherein the series of cuts in the low density strips form planes that are not perpendicular to the major or minor face of the low density strips.

14. The process of claim 12, wherein the series of cuts in the low density strips form planes that are perpendicular to the major or minor face of the low density strips.

15. The process of claim 12, wherein the low density strips are arranged such that the series of cuts on each low density strip are on the face of the low density strips facing the first side of the core panel.

16. The process of claim 15 wherein the series of cuts on the low density strips form aligned cuts or staggered cuts on the first side of the core panel.

17. The process of claim 12, wherein the slices in the sheet form a series of cuts in the major face and minor face of the low density strips.

18. The process of claim 12, wherein the reinforcement sheet wherein the continuous fibrous reinforcement sheets is threaded through the low density strips such that the fibrous reinforcement sheet is disposed between adjacent strips and adjacent to the major faces of the low density strips and forms at least about sixty five percent (65%) of the surface area of the first side of the core panel and at least about sixty five percent (65%) of the surface area of the second side of the core panel.

19. The process of claim 12, further comprising between the steps of (b) and (c) the step of inserting a fabric layer into at least a portion of the slices in the low density sheet.

20. The process of claim 12, further comprising between the steps of (c) and (d) the step of inserting a fabric layer into at least a portion of the cuts in the low density strips.

21. The process of claim 12, further comprising bending the fiber reinforced core panel along the direction parallel to the longitudinal axes of the low density strips before step (g).

22. A process for forming a fiber reinforced core panel comprising:

(a) obtaining a sheet of a low density material having a first direction, a second direction perpendicular to the first direction, a thickness, an upper side and a lower side;

(b) dividing the sheet in the second direction of the sheet into a series of low density strips having at least three faces and having a length to width aspect ratio of at least 5:1, wherein the cross-section of each strip has a major face, a first edge face, a second edge face, and optionally a minor face;

(c) slicing at least a portion of the strips a plurality of times on the major or minor face to form slices in the sheet, wherein the slices extend through only a portion of a thickness of each strip;

(d) arranging the series of low density strips to form a core panel having a first side and an opposing second side such that the longitudinal axis of the low density strips are substantially parallel and the major face of each strip is disposed within the first or second side of the core panel, wherein the major face of each strip is disposed within an opposite face of the core panel than the major face of the adjacent strips; and, (e) threading a continuous fibrous reinforcement sheet through the low density strips such that the fibrous reinforcement sheet is disposed between adjacent strips and adjacent to the major or minor faces of the low density strips.

23. The process of claim 22, further comprising between the steps of (c) and (d) the step of inserting a fabric layer into at least a portion of the slices in the low density strips.

\* \* \* \* \*